(12) United States Patent
Byun

(10) Patent No.: US 11,119,699 B2
(45) Date of Patent: Sep. 14, 2021

(54) DATA PROCESSING SYSTEM AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 29 days.

(21) Appl. No.: 16/676,180

(22) Filed: Nov. 6, 2019

(65) Prior Publication Data

US 2020/0192604 A1    Jun. 18, 2020

(30) Foreign Application Priority Data

Dec. 13, 2018 (KR) .................. 10-2018-0160903

(51) Int. Cl.
    *G06F 3/06* (2006.01)

(52) U.S. Cl.
    CPC .......... *G06F 3/0659* (2013.01); *G06F 3/0611* (2013.01); *G06F 3/0631* (2013.01); *G06F 3/0656* (2013.01); *G06F 3/0679* (2013.01)

(58) Field of Classification Search
    CPC ...... G06F 3/061; G06F 3/0611; G06F 3/0631; G06F 3/064; G06F 3/0656; G06F 3/0659; G06F 3/0679; G06F 12/0653
    See application file for complete search history.

(56) References Cited

U.S. PATENT DOCUMENTS

| | | | |
|---|---|---|---|
| 8,321,627 B1* | 11/2012 | Norrie | G06F 13/161 711/103 |
| 2010/0023682 A1* | 1/2010 | Lee | G06F 12/0246 711/103 |
| 2015/0212943 A1* | 7/2015 | Yang | G06F 12/0862 711/137 |
| 2017/0083234 A1* | 3/2017 | Lin | G06F 3/061 |
| 2019/0361708 A1* | 11/2019 | Soe | G06F 9/30101 |

FOREIGN PATENT DOCUMENTS

| | | |
|---|---|---|
| KR | 10-1522402 | 5/2015 |
| KR | 10-2017-0054633 | 5/2017 |

* cited by examiner

*Primary Examiner* — Larry T MacKall
(74) *Attorney, Agent, or Firm* — IP & T Group LLP

(57) ABSTRACT

A data processing system includes a host suitable for generating a candidate logical block address (LBA) list including a plurality of candidate LBAs, a memory device suitable for storing a plurality of map segments and user data corresponding to the respective map segments, and a controller suitable for receiving the candidate LBA list from the host, and loading target map segments from the memory device, the target map segments corresponding to the plurality of candidate LBAs.

20 Claims, 15 Drawing Sheets

FIG. 2

| Candidate LBA list | | |
|---|---|---|
| Number | Start LBA | Length |
| 1 | LBA1 | 1 |
| 2 | LBA43 | 1 |
| 3 | LBA5 | 6 |
| 4 | LBA110 | 2 |
| ⋮ | | |
| n | | |

210 — rows 1  
230 — row 3

FIG. 3

| Command queue | |
|---|---|
| Slot number | Command |
| 1 | Read |
| 2 | Write |
| 3 | Read |
| 4 | Forecast |
| ⋮ | |
| m | |

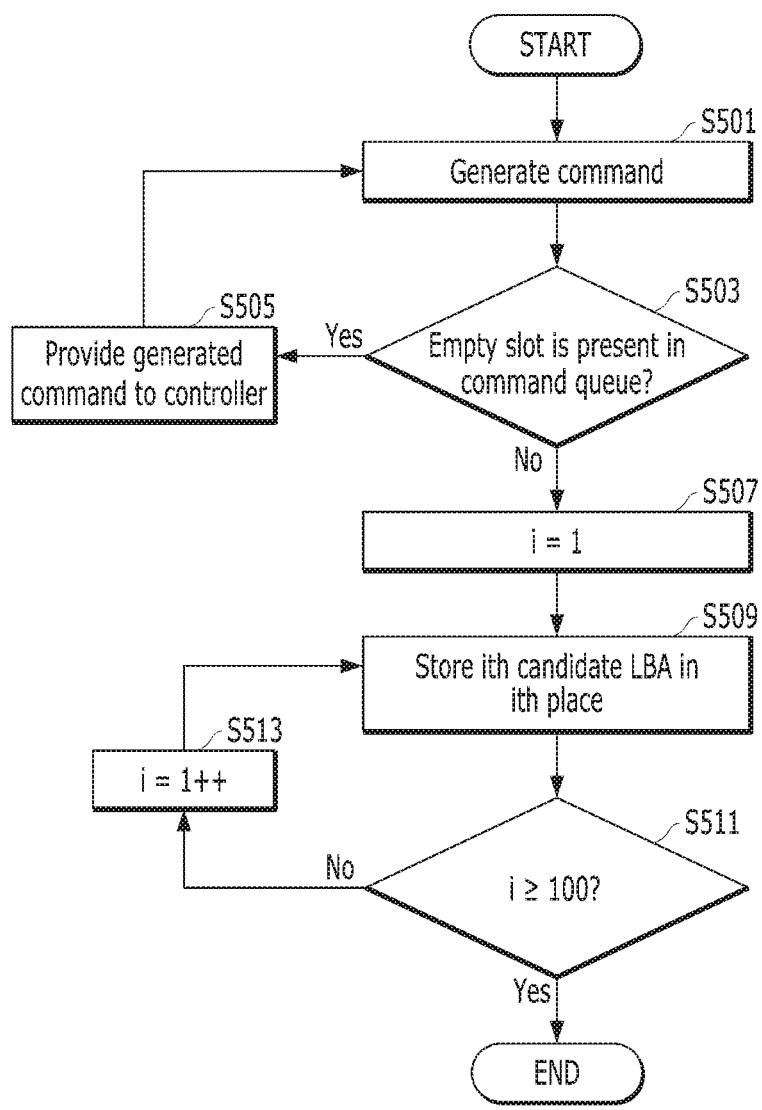

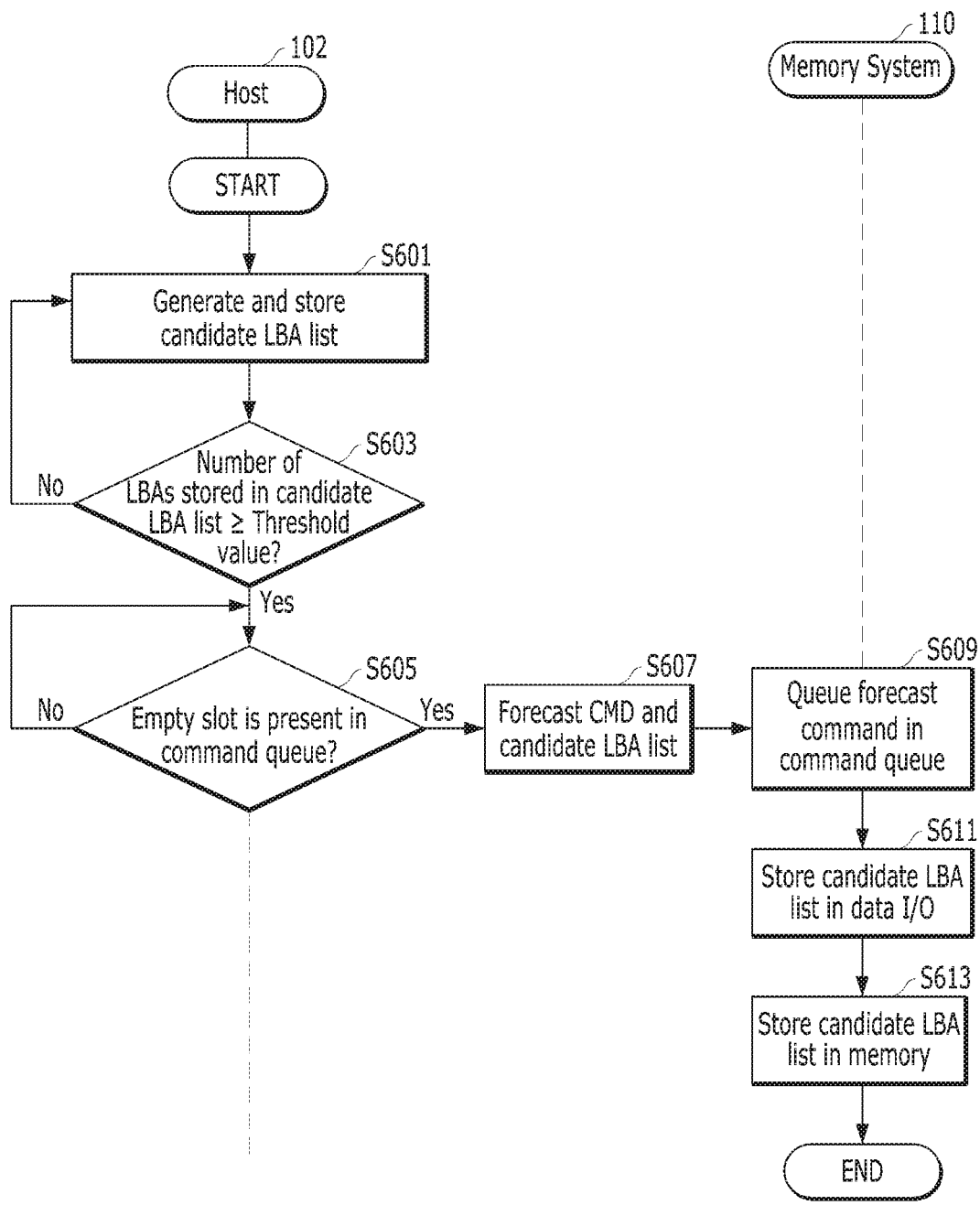

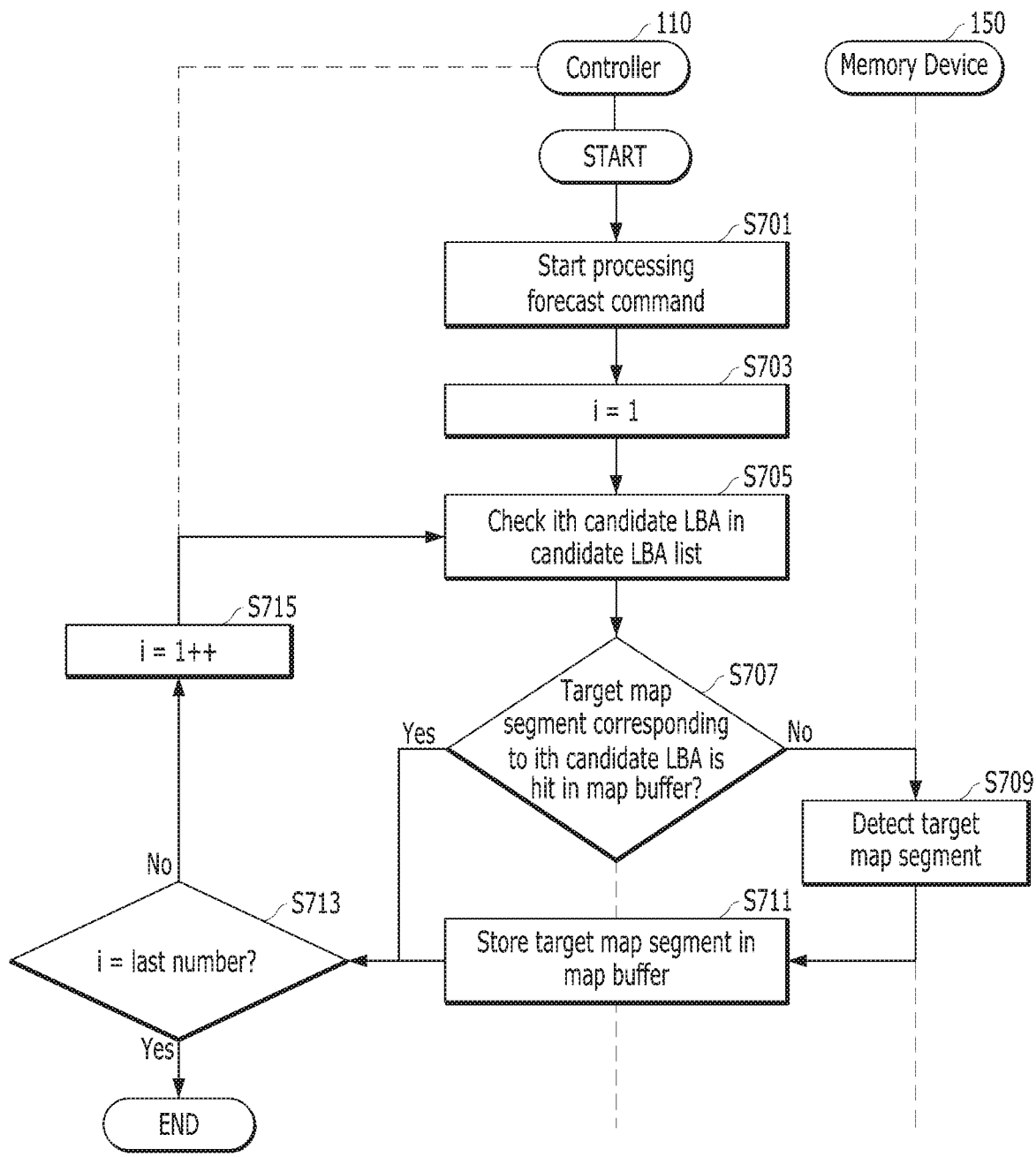

DATA PROCESSING SYSTEM AND OPERATING METHOD THEREOF

CROSS-REFERENCE TO RELATED APPLICATION

This application claims priority under 35 U.S.C. § 119 to Korean Patent Application No. 10-2018-0160903 filed on Dec. 13, 2018, which is incorporated herein by reference in its entirety.

BACKGROUND

1. Field

Various embodiments relate to a data processing system and operating method of the same, and more particularly, to a data processing system which performs a read operation efficiently and operating method of the same.

2. Discussion of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSDs).

SUMMARY

Various embodiments are directed to a data processing system which predicts a map segment corresponding to user data to be read in the future and loads the map segment to perform a read operation quickly.

In an embodiment, a data processing system may include: a host suitable for generating a candidate logical block address (LBA) list including a plurality of candidate LBAs; a memory device suitable for storing a plurality of map segments and user data corresponding to the respective map segments; and a controller suitable for receiving the candidate LBA list from the host, and loading target map segments from the memory device, the target map segments corresponding to the plurality of candidate LBAs.

In an embodiment, an operation method of a data processing system may include: checking, by a host, whether an empty slot is present among a plurality of slots in a command queue; generating, by the host, a candidate LBA list when the empty slot is not present; providing, by the host, a forecast command and the candidate LBA list from a host to a controller; retrieving, by the controller, target map segments corresponding to a plurality of candidate LBAs from a map buffer, based on the candidate LBA list; loading, by the controller, the target map segments corresponding to the respective candidate LBAs from a memory device, when the target map segments are not retrieved from the map buffer; and storing, by the controller, the loaded target map segments in the map buffer.

In an embodiment, a data processing system may include: a memory device suitable for storing a plurality of map segments and multiple pieces of data corresponding to the plurality of map segments; a host suitable for transmitting a read request for a piece of data among the multiple pieces of data, and generating and transmitting a candidate list for storing address information corresponding to at least one next piece of data to be read after reading the piece of data; and a controller suitable for reading the piece of data from the memory device to provide the piece of data to the host, in response to the read request, receiving the candidate list and loading the target map segment among the plurality of map segments from the memory device, based on the address information.

BRIEF DESCRIPTION OF THE DRAWINGS

FIG. 2 is a diagram illustrating a structure of a candidate LBA list in accordance with an embodiment.

FIG. 3 a diagram illustrating a structure of a command queue in accordance with an embodiment.

FIGS. 5A to 8B are conceptual diagram and flowchart illustrating operations of a data processing system in accordance with an embodiment.

DETAILED DESCRIPTION

Figure 1:
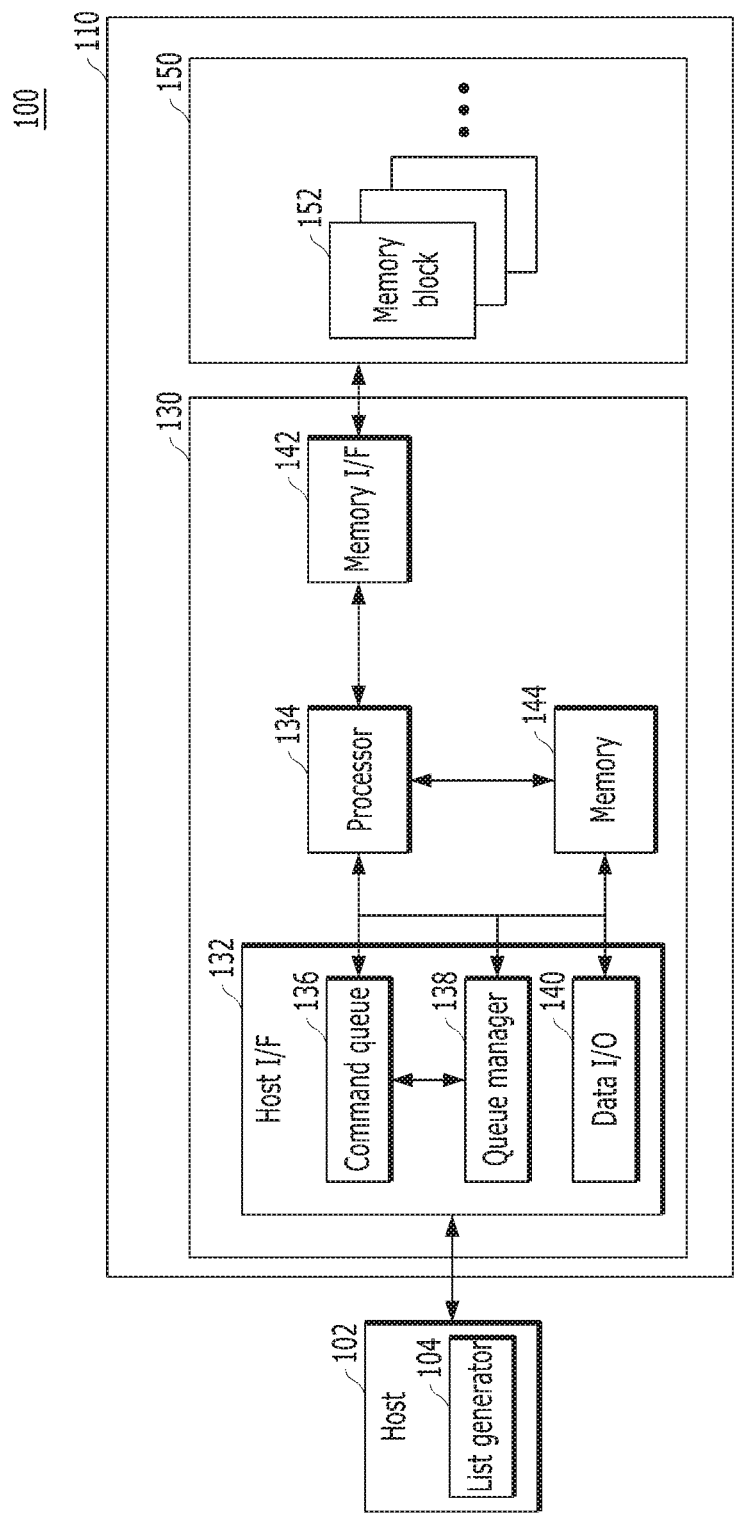
FIG. 1 is a block diagram illustrating a data processing system including a memory system in accordance with an embodiment of the present invention.

Various embodiments of the present invention are described below in more detail with reference to the accompanying drawings. However, various elements and features of the present invention may be configured or arranged differently than shown in the described embodiments, as will be apparent to those skilled in the art in light of this disclosure. Thus, the present invention is not limited to the embodiments set forth herein. Rather, the described embodiments are provided so that this disclosure is thorough and complete, and fully conveys the present invention to those skilled in the art to which this invention pertains. Moreover, reference to "an embodiment" does not necessarily mean only one embodiment, and different references to "an embodiment" are not necessarily to the same embodiment(s). Throughout the disclosure, like reference numerals refer to like parts throughout the various figures and embodiments of the present invention.

It will be understood that, although the terms "first", "second", "third", and so on may be used herein to identify various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate various features of the disclosed embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to limit the present invention. As used herein, singular forms are intended to include the plural forms and vice versa, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art, and should not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Various embodiments of the present invention will be described in detail with reference to the attached drawings.

FIG. 1 is a block diagram illustrating a data processing system 100 including a memory system 110 in accordance with an embodiment of the present invention. The arrows between the components shown in FIG. 1 represent the paths of data and commands, and do not represent actual physical connections. Data and commands can be transferred to the memory system 110 through a bus that can be shared among the components.

Referring to FIG. 1, the data processing system 100 may include a host 102 operatively coupled to the memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS) or a plurality of OSs, and execute an OS to perform an operation with the memory system 110 according to a user request. The host 102 may provide the memory system 110 with a plurality of commands corresponding to a user request. The memory system 110 may perform operations corresponding to the commands provided from the host 102. The OS may manage and control overall functions and operations of the host 102, and provide an interaction between the host 102 and the data processing system 100 or a user who uses the memory system 110.

For example, in case of a read request for user data, the host 102 may provide the memory system 110 with a read command and a logical block address (LBA) for performing a read operation. The memory system 110 may perform a read operation corresponding to the read command provided from the host 102. However, when the memory system 110 has many operations in progress, the host 102 cannot provide a command to the memory system 110. At this time, the host 102 may create a list of LBAs corresponding to data to be read afterwards. Hereafter, the LBAs will be referred to as candidate LBAs.

Specifically, the host 102 may include a list generator 104 which can be operated by the OS. The list generator 104 may generate and store a candidate LBA list 200 of FIG. 2, when the memory system 110 cannot receive a command corresponding to a user request from the host 102. Hereafter, referring to FIG. 2, the candidate LBA list 200 will be described.

FIG. 2 illustrates a structure of the candidate LBA list 200 in accordance with an embodiment.

Referring to FIG. 2, the candidate LBA list 200 may include information on 'Start LBA' of candidate LBAs corresponding to a plurality of read commands which are to be executed afterwards according to a user request, 'Length' indicating the sizes of the candidate LBAs, and 'Number' indicating the order in which the candidate LBAs are stored in the candidate LBA list 200. Each of candidate LBAs having a length greater than '1' may include a plurality of consecutive LBAs. On the other hand, each candidate LBAs having a length of '1' may include only itself.

For example, in the candidate LBA list 200 of FIG. 2, a first candidate LBA 210 of the plurality of candidate LBAs was stored in the candidate LBA list 200 for the first time, and a first LBA LBA1 is the start LBA of the first candidate LBA 210 and has a length of '1'. That is, the first candidate LBA 210 may include only the first LBA LBA1. For another example, a third candidate LBA 230 of the plurality of candidate LBAs was stored in the candidate LBA list 200 for the third time, and a fifth LBA LBA5 is the start LBA of the third candidate LBA 230 and has a length of '6'. Therefore, the third candidate LBA 230 may include fifth to tenth LBAs. However, this is only an example, but the present embodiment is not limited thereto.

Referring back to FIG. 1, the list generator 104 may store candidate LBAs in the candidate LBA list 200 described with reference to FIG. 2. The candidate LBAs may correspond to a plurality of read commands which are to be executed afterwards according to a user request. Furthermore, when the size of data corresponding to the user request is greater than or equal to a predetermined threshold size, the list generator 104 may generate the candidate LBA list 200. For example, when the memory system 110 cannot receive a command corresponding to a user request from the host 102 because the predetermined threshold size is '100 KB' and the size of data corresponding to the user request is '160 KB', the list generator 104 may generate the candidate LBA list 200 in which candidate LBAs corresponding to '160 KB' are stored. On the other hand, even when the memory system 110 cannot receive a command corresponding to a user request from the host 102, the list generator 104 may not generate the candidate LBA list 200 in the case that the size of data corresponding to the user request is less than the predetermined threshold size.

The list generator 104 may store candidate LBAs in the candidate LBA list only up to a predetermined 'number'. The candidate LBAs may correspond to a plurality of read commands which are to be executed according to a user request. For example, when 'number' is set to '100', the list generator 104 may store candidate LBAs in the candidate LBA list up to '100'. In this case, 'n' in FIG. 2 is '100'. For another example, when the number of candidate LBAs corresponding to read commands which are to be executed according to a user request is '150', the list generator 104 may generate a candidate LBA list for the '100' candidate LBAs, and not separately generate a candidate LBA list for the other '50' candidate LBAs.

Subsequently, when the memory system 110 is switched to a state in which the memory system 110 can receive a command corresponding to a user request from the host 102, the host 102 may provide a forecast command to the memory system 110. The forecast command may include information on the last number stored in the candidate LBA list.

The memory system 110 may operate to store data for the host 102 in response to a request of the host 102. Non-limiting examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the. The SD card may include a mini-SD card and micro-SD card.

The memory system 110 may be embodied by various types of storage devices. Examples of such storage devices may include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device. Non-limiting application examples of the memory system 110 may include a computer, a smart phone, and a portable game machine.

The memory device 150 may be a nonvolatile memory device and may retain data stored therein even though power is not supplied. The memory device 150 may store data provided from the host 102 through a write operation, and provide data stored therein to the host 102 through a read operation.

Each of a plurality of memory blocks 152 may include a plurality of pages, and each of the pages may include a plurality of memory cells coupled to a word line. The memory device 150 may include a plurality of planes each of which may include the plurality of memory blocks 152, and include a plurality of memory dies each of which may include the plurality of planes. In an embodiment, the memory device 150 may be a flash memory. The flash memory may have a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, program and erase operations of the memory device 150.

The controller 130 may include a host interface (I/F) 132, a processor 134, a memory I/F 142, and a memory 144 all operatively coupled via an internal bus.

The host interface 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (DATA), enhanced small disk interface (ESDI) and integrated drive electronics (IDE). The host interface 132 may be driven through firmware referred to as a host interface layer (HIL) in order to exchange data with the host.

Specifically, the host interface 132 may include a command queue 136 capable of queuing commands provided from the host 102, a queue manager 138 capable of managing the command queue 136, and a data input and output (I/O) circuit 140 capable of inputting/outputting data provided from the host 102.

The command queue 136 may include a plurality of slots. The command queue 136 may queue the commands provided from the host 102 in the respective slots. Hereafter, referring to FIG. 3, the structure of the command queue 136 will be described.

FIG. 3 illustrates a structure of the command queue 136 in accordance with an embodiment.

Referring to FIG. 3, the command queue 136 may include a plurality of slots (e.g., m slots), and include numbers corresponding to the respective slots and commands queued in the respective slots. For example, a command queued in a first slot is 'Read' command. Furthermore, a command queued in a second slot is 'Write' command. The command queue 136 may have a first-in first-out (FIFO) structure. When the command queue 136 has a FIFO structure, the 'Read' command queued in the first slot may be first processed, and the 'Write' command queued in the second slot may be then processed. However, this is only an example, and the present embodiment is not limited thereto.

The command queue 136 may have a limited number of slots (hereafter, referred to as a queue depth). Therefore, the command queue 136 may queue a plurality of commands received from the host 102 only up to the queue depth. For example, when the queue depth is '32' (i.e., m in FIG. 3 is '32'), the command queue 136 may queue only '32' commands provided from the host 102 in the slots. If commands are queued in all of the '32' slots, the host 102 cannot provide a command to the memory system 110 anymore. When one or more of the commands queued in the '32' slots are processed to create an empty slot, the host 102 can provide a command to the memory system 110, and the provided command may be queued in the empty slot within the command queue 136. Furthermore, when the command queue 136 has no empty slots, the host 102 may generate the candidate LBA list 200.

Referring back to FIG. 1, the queue manager 138 may manage the command queue 136. Specifically, the queue manager 138 may check whether the command queue 136 has empty slots. If the command queue 136 has no empty slots, the queue manager 138 may provide the host 102 with information indicating that the command queue 136 has no empty slots (hereafter, referred to as empty slot information). The host 102 may determine whether to provide a command to the memory system 110, based on the empty slot information. Furthermore, the queue manager 138 may decide a processing order of commands queued in the command queue 136. If the command queue 136 does not have a FIFO structure, the commands queued in the command queue 136 may be processed according to the processing order decided by the queue manager 138. The queue manager 138 may inform the processor 134 of the commands based on the decided processing order.

The data I/O circuit 140 may receive data corresponding to a command from the host 102 and store the received data, under control of the processor 134. The data I/O circuit 14 may have a FIFO structure like the command queue 136.

For example, when the host 102 provides a read command to the memory system 110, the data I/O circuit 140 may receive data such as LBA information corresponding to the read command from the host 102. The data I/O circuit 140 may store the data under control of the processor 134.

For another example, when the host 102 provides a write command to the memory system 110, the data I/O circuit 140 may receive write data corresponding to the target of the write command from the host 102. The data I/O circuit 140 may store the write data under control of the processor 134.

For another example, when the host 102 provides a forecast command to the memory system 110, the data I/O circuit 140 may receive the candidate LBA list 200. The data I/O circuit 140 may store the data associated with the candidate LBA list 200 under control of the processor 134.

The data I/O circuit 140 may provide the data received from the host 102 to the memory 144 under control of the processor 134.

When the host 102 provides a read command to the memory system 110, the data I/O circuit 140 may output user data corresponding to the read command to the host 102 under control of the processor 134. The user data may be loaded to the memory 144 from the memory device 150.

The memory interface 142 may interface the controller 130 and the memory device 150, such that the controller 130 controls the memory device 150 in response to a request of the host 102.

The memory 144 may serve as a working memory of the memory system 110 and the controller 130, and store data for driving the memory system 110 and the controller 130.

The memory 144 may be implemented as a volatile memory. For example, the memory 144 may be implemented as a static random access memory (SRAM) or a dynamic random access memory (DRAM). In an embodiment, the memory 144 may be present inside the controller 130. Alternatively, the memory 144 may be present outside the controller 130. At this time, the memory 144 may be implemented as an external volatile memory to and from which data from the controller 130 is inputted and outputted through the memory interface 142.

The memory 144 may store data required for performing a data write/read operation between the host 102 and the memory device 150 and data during the data write/read operation. For example, when the host 102 provides a read command to the memory system 110, the memory 144 may load read data to be provided to the host 102 from the memory device 150, and temporarily store the read data. For another example, when the host 102 provides a forecast command to the memory system 110, the memory 144 may store the candidate LBA list 200 provided from the host 102. The memory 144 may include a program memory, a data memory, a write buffer/cache, a read buffer/cache, a data buffer/cache, a map buffer/cache and the like, in order to store the data.

The processor 134 may control overall operations of the memory system 110. In response to a write command, a read command and a forecast command of the host 102, the processor 134 may perform operations corresponding to the respective commands on the memory device 150. The operation of the processor 134 will be described in more detail with reference to FIG. 4.

Hereafter, referring to FIG. 4, command operations which are performed in the memory system 110 in accordance with the present embodiment will be described in detail.

Figure 4:
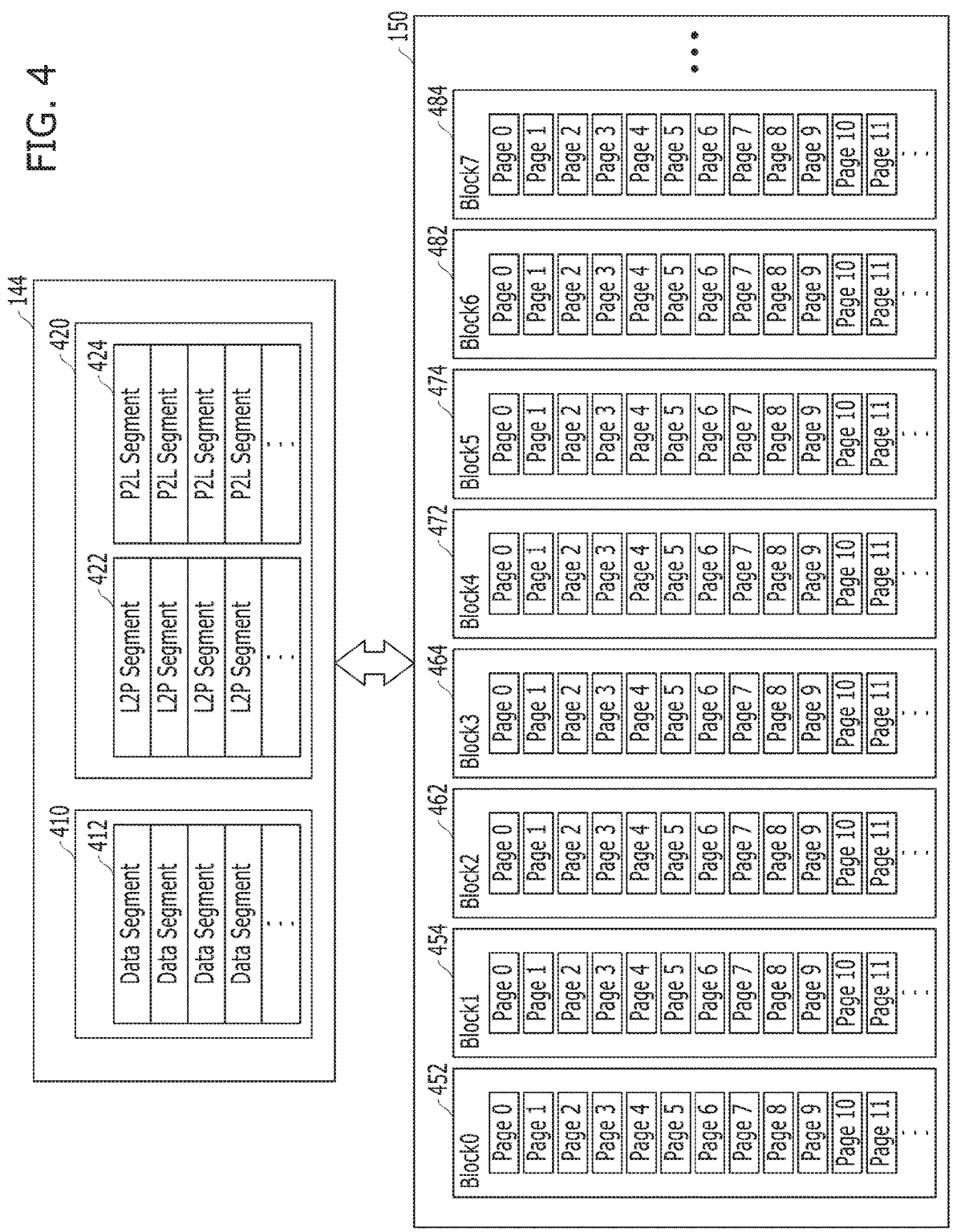
FIG. 4 is a conceptual diagram illustrating an operation of a memory system in accordance with an embodiment.

FIG. 4 is a conceptual diagram illustrating an operation of the memory system 110 in accordance with an embodiment. FIG. 4 illustrates only the memory 144 and the memory device 150, but data may be moved from the memory 144 to the memory device 150 or from the memory device 150 to the memory 144, under control of the processor 134.

In accordance with an embodiment, when the host 102 provides a read command to the memory system 110, the processor 134 may perform a read operation. Specifically, the processor 134 may retrieve a map segment from the memory 144. The map segment may correspond to an LBA provided from the host 102 with the read command. If the map segment is not retrieved from the memory 144, the processor 134 may load the map segment from the memory device 150. Then, the processor 134 may load data corresponding to the read command from the memory device 150 based on the loaded map segment, store the loaded data in the memory 144, and output the stored data through the host interface 132.

The controller 130 may perform command operations corresponding to the plurality of commands received from the host 102. For example, when the host 102 provides write commands to the memory system 110, the controller 130 may perform program operations. At this time, the controller 130 may store user data corresponding to the write commands by programming the user data to memory blocks 452 to 484 of the memory device 150. Further, the controller 130 may generate and update meta data for the user data according to the operation of programming the user data to the memory blocks 452 to 484, and then store the meta data in the memory blocks 452 to 484 of the memory device 150.

The controller 130 may generate and update information indicating that the user data are stored in pages in the plurality of blocks 452 to 484 of the memory device 150, for example, first map data and second map data. In other words, the controller 130 may generate and update logical segments of the first map data, i.e. L2P segments, and physical segments of the second map data, i.e. P2L segments, and then store the L2P segments and the P2L segments in the pages in the memory blocks 452 to 484 of the memory device 150.

For example, the controller 130 may store the user data in the data buffer 410 in the memory 144 of the controller 130. The user data may correspond to the write commands provided from the host 102. Furthermore, after storing data segments 412 of the user data in the data buffer 410, the controller 130 may store the data segments 412 in the data buffer 410 into the pages in the memory blocks 452 to 484 of the memory device 150. As the data segments 412 of the user data corresponding to the write commands provided from the host 10 are programmed and stored into the pages in the memory blocks 452 to 484 of the memory device 150, the controller 130 may generate and update the first map data and the second map data, and store the first map data and the second map data in the map buffer 420 in the memory 144 of the controller 130. That is, the controller 130 may store the L2P segments 422 of the first map data and the P2L segments 424 of the second map data for the user data in the map buffer 420. As described above, the L2P segments 422 of the first map data and the P2L segments 424 of the second map data or a map list for the L2P segments 422 of the first map data and a map list for the P2L segments 424 of the second map data may be stored in the map buffer 420 in the memory 144 of the controller 130. Furthermore, the controller 130 may store the L2P segments 422 of the first map data and the P2L segments 424 of the second map data, stored in the map buffer 420, into the pages in the memory blocks 452 to 484 of the memory device 150.

For another example, the controller 130 may perform read operations corresponding to read commands provided from the host 102. At this time, the controller 130 may read user data stored in the memory blocks 452 to 484 of the memory device 150, based on map segments of user data corresponding to the read commands, for example, the L2P segments 422 of the first map data and the P2L segments 424 of the second map data. However, when a map segment corresponding to an LBA provided with a read command from the host 102 is not present in the map buffer 420, the controller 130 may load the map segment into the map buffer 420 and check the loaded map segment. Then, the controller 130 may read user data stored in pages of the corresponding memory blocks among the memory blocks 452 to 484 of the memory device 150. Furthermore, the controller 130 may store the data segments 412 of the read user data in the data buffer 410, and then output the data segments 412 to the host 102.

For another example, when the host 102 provides forecast commands to the memory system 110, the controller 130 may perform operations corresponding to the forecast commands. At this time, the controller 130 may check the candidate LBA list 200 stored in the memory 144, load a map segment corresponding to a candidate LBA stored in the candidate LBA list 200 from the memory device 150, and store the loaded map segment in the map buffer 420. However, when the map segment corresponding to the candidate LBA is already present in the map buffer 420, the controller 130 may utilize the map segment which is already present in the map buffer 420. By loading a map segment corresponding to a read command to be provided afterwards by an operation corresponding to the forecast command (hereafter, referred to as a forecast operation) to the map buffer 420 in advance, the controller 130 may rapidly perform a read operation.

Hereafter, referring to FIGS. 5A to 8B, an operation of the data processing system 100 in accordance with the present embodiment will be described. Specifically, an operation of the data processing system 100 for processing a forecast command will be described. For convenience of description, suppose that 'n' of the candidate LBA list 200 is '100', and 'm' of the command queue 136 is '32'. Furthermore, suppose that the size of data by a user request is large enough to generate the candidate LBA list. In addition, suppose that the command queue 136 and the data I/O circuit 140 have a FIFO structure. However, this is only an example, and the present embodiment is not limited thereto. Furthermore, only components required for description are illustrated in each of the drawings.

Figure 5A:
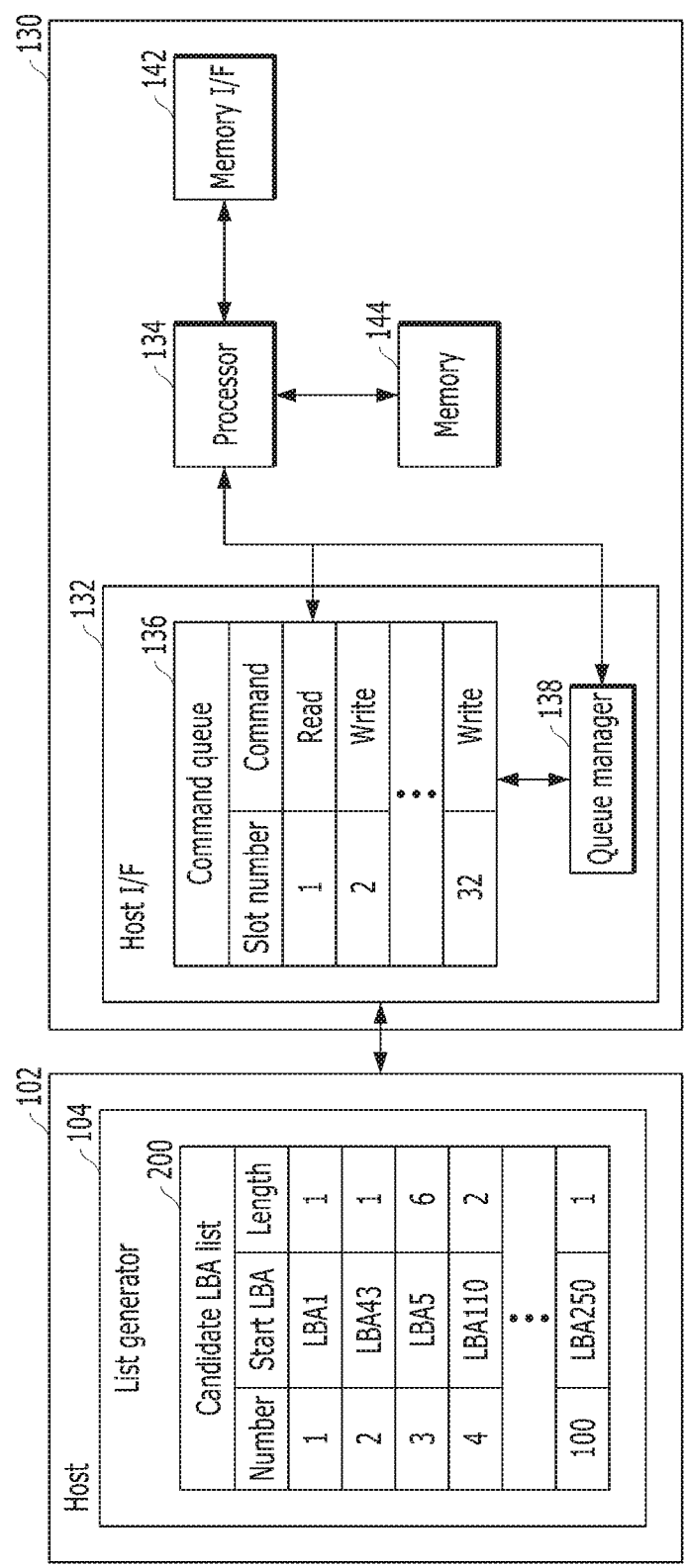

FIG. 5A is a conceptual diagram illustrating operations of the host 102 and the controller 130 in accordance with an embodiment. In particular, FIG. 5A is a conceptual diagram illustrating the operation of generating the candidate LBA list 200 in accordance with the present embodiment.

First, the host 102 may provide the memory system 110 with a plurality of commands generated by a user request. The commands provided from the host 102 may be queued in the command queue 136 within the host interface 132.

For example, '32' commands may be queued in the plurality of slots within the command queues 136, respectively. When the plurality of commands are all queued in the respective '32' slots, the queue manager 138 may check that the command queue 136 has no empty slot. The queue manager 138 may provide empty slot information to the host 102 in order to inform the host 102 that there is no empty slot.

The host 102 receiving the empty slot information cannot provide a command to the memory system 110 until an empty slot occurs in the command queue 136. At this time, the list generator 104 in the host 102 may generate the candidate LBA list 200 having candidate LBAs stored therein, the candidate LBAs corresponding to a plurality of read commands, respectively, which are to be generated afterwards by a user request. The list generator 104 may store the candidate LBA list.

FIG. 5B is a flowchart illustrating the process of generating the candidate LBA list 200 in accordance with the present embodiment.

Referring to FIG. 5B, in step S501, the host 102 may generate a read command or write command according to a user request.

In step S503, the host 102 may determine whether the command queue 136 has an empty slot, based on empty slot information provided by the queue manager 138.

When it is determined that there is an empty slot ('Yes' in step S503), the host 102 may provide the generated read or write command to the memory system 110 in step S505. The provided command may be queued in the empty slot within the command queue 136.

On the other hand, when it is determined that there is no empty slot ('No' in step S503), the list generator 104 may reset the value of 'i' (i.e., i=1) to generate the candidate LBA list 200 in step S507. Here, 'i' represents the number of the candidate LBA list 200.

In step S509, the list generator 104 may store an $i^{th}$ candidate LBA in an $i^{th}$ place within the candidate LBA list 200. The $i^{th}$ candidate LBA may correspond to a read command to be generated afterwards.

In step S511, the list generator 104 may determine whether the value of 'i' is greater than or equal to '100'. Since it is assumed that 'n' is '100', the value of 'i' may be compared to '100'.

When it is determined that the value of 'i' is less than '100'. ('No' in step S511), the list generator 104 may increase the value of 'i' by '1' (i.e., i=1++) to continuously store a candidate LBA in the candidate LBA list 200 through steps S509 and S511.

On the other hand, when it is determined that the value of 'i' is greater than or equal to '100' ('Yes' in step S511), the list generator 104 may complete the generating of the candidate LBA list 200. As a result, the list generator 104 may generate the candidate LBA list 200 in which the first to 100th candidate LBAs are stored as illustrated in FIG. 5A.

Although not illustrated in FIG. 5B, the list generator 104 may generate another candidate LBA list different from the generated candidate LBA list, if there are more candidate LBAs than the 100 candidate LBAs corresponding to the user request. For example, when there are 150 candidate LBAs corresponding to a user request, the list generator 104 may generate a first LBA list including first to 100th candidate LBAs, and generate a second candidate LBA list including 101st to 150th candidate LBAs.

Figure 6A:
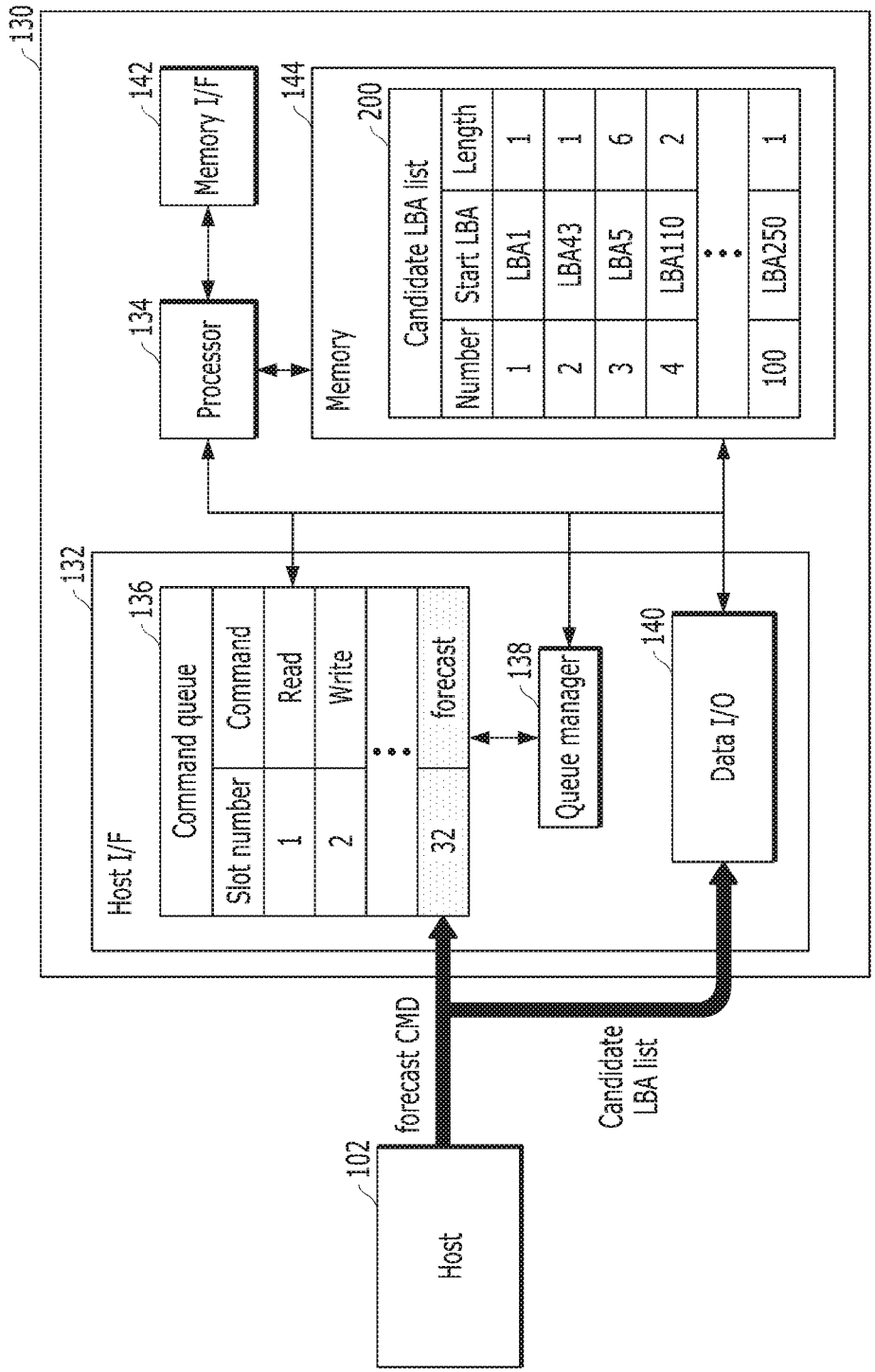

FIG. 6A is a conceptual diagram illustrating operations of the host 102 and the controller 130 in accordance with an embodiment. In particular, FIG. 6A is a conceptual diagram illustrating the operation of the host 102 to provide the forecast command and the candidate LBA list 200 to the controller 130, and the operation of the controller 130 to process the forecast command and the candidate LBA list 200 in accordance with the present embodiment.

When an empty slot occurs in the plurality of slots within the command queue 136, the queue manager 138 may provide empty slot information to inform the host 102 of the occurrence of the empty slot. Then, the host 102 may provide the forecast command and the candidate LBA list 200 to the memory system 110 based on the empty slot information. The forecast command may include information on the 'number' of the candidate LBA list 200, which is stored in the candidate LBA list 200.

First, the command queue 136 may queue the forecast command provided from the host 102 in the empty slot. Since it was assumed that the command queue 136 has a FIFO structure, the forecast command may be first queued in the 32nd slot.

The data I/O circuit 140 may receive the candidate LBA list 200 from the host 120 with the forecast command. The data I/O circuit 140 may store the candidate LBA list 200 under control of the processor 134. The provided candidate LBA list 200 may be stored in the memory 144 under control of the processor 134.

After a plurality of commands queued before the forecast command are completely processed, the processing of the forecast command may be started. When the processing of the plurality of commands queued before the forecast command is completed, the forecast command may be queued in the first slot. At this time, the queue manager 138 may request the processor 134 to start processing the forecast command queued in the first slot. Then, the processor 134 may perform a forecast operation based on information on the last 'number' stored in the candidate LBA list 200 in the forecast command.

FIG. 6B is a flowchart illustrating the process of providing the forecast command and the candidate LBA list 200 to the memory system 110 in accordance with the present embodiment.

Referring to FIG. 6B, in step S601, the host 102 may generate the candidate LBA list 200, and store the generated candidate LBA list 200 therein until the candidate LBA list 200 is provided to the memory system 110.

In step S603, the host 102 may compare the number within the candidate LBA list 200 to a preset threshold value. That is, referring to FIG. 6A, the host 102 may check whether 100 candidate LBAs are stored in the candidate LBA list 200.

When it is checked that the number of candidate LBAs stored in the candidate LBA list 200 is less than the preset threshold value ('No' in step S603), the procedure may return to step S601, and the host 102 may continuously generate the candidate LBA list 200.

On the other hand, when it is checked that the number of candidate LBAs stored in the candidate LBA list 200 is greater than or equal to the preset threshold value ('Yes' in step S603), the host 102 may determine whether an empty slot is present in the command queue 136, based on the empty slot information provided from the queue manager 138, in step S605.

When it is determined that there is no empty slot ('No' in step S605), the host 102 may wait until an empty slot occurs in the command queue 136.

On the other hand, when it is determined that there is an empty slot ('Yes' in step S605), the host 102 may provide a forecast command (CMD) and the candidate LBA list 200 to the memory system 110 in step S607.

In step S609, the command queue 136 may queue the forecast command in the empty slot.

In step S611, the data I/O circuit 140 may receive the candidate LBA list 200. The data I/O circuit 140 may store the candidate LBA list 200 under control of the processor 134.

Although steps S609 and S611 are separately described, the operations corresponding to steps S609 and S611, respectively, may be performed in parallel to each other.

In step S613, the candidate LBA list 200 may be stored in the memory 144 under control of the processor 134.

Figure 6C:
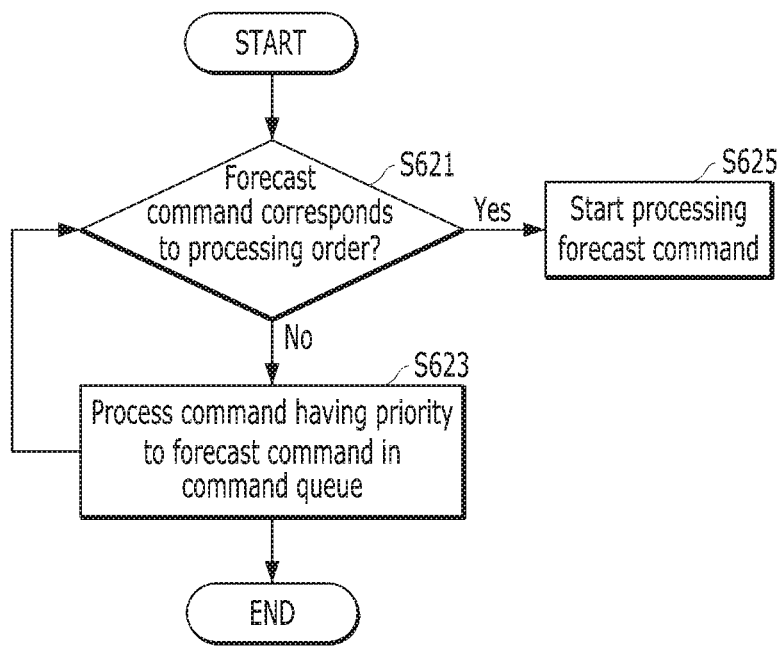

FIG. 6C is a flowchart illustrating a point of time that the forecast command is processed in accordance with the present embodiment.

Referring to FIG. 6C, in step S611, a command queued in the first slot may be preferentially processed according to the characteristic of the command queue 136 having a FIFO structure. At this time, the queue manager 138 may determine whether to start processing the forecast command queued in step S609 of FIG. 6B.

When it is determined that the forecast command is not a processing target ('No') in step S621), the queue manager 138 may process a command having a priority to the forecast command queued in the command queue 136 in step S623. Specifically, the queue manager 138 may request the processor 134 to process the command queued in the first slot. When the processing of the command queued in the first slot is completed, a command queued in the second slot may be queued in the first slot, and the queue manager 138 may request the processor 134 to process the command queued in the first slot. Then, the procedure may return to step S621, and the queue manager 138 may determine whether to start processing the forecast command.

On the other hand, when it is determined that the forecast command is the processing target ('Yes' in step S621), the queue manager 138 may process the forecast command. Specifically, the queue manager 138 may request the processor 134 to process the forecast command. Then, the processor 134 may perform a forecast operation based on information on the last 'number' stored in the candidate LBA list 200 included in the forecast command.

Figure 7A:
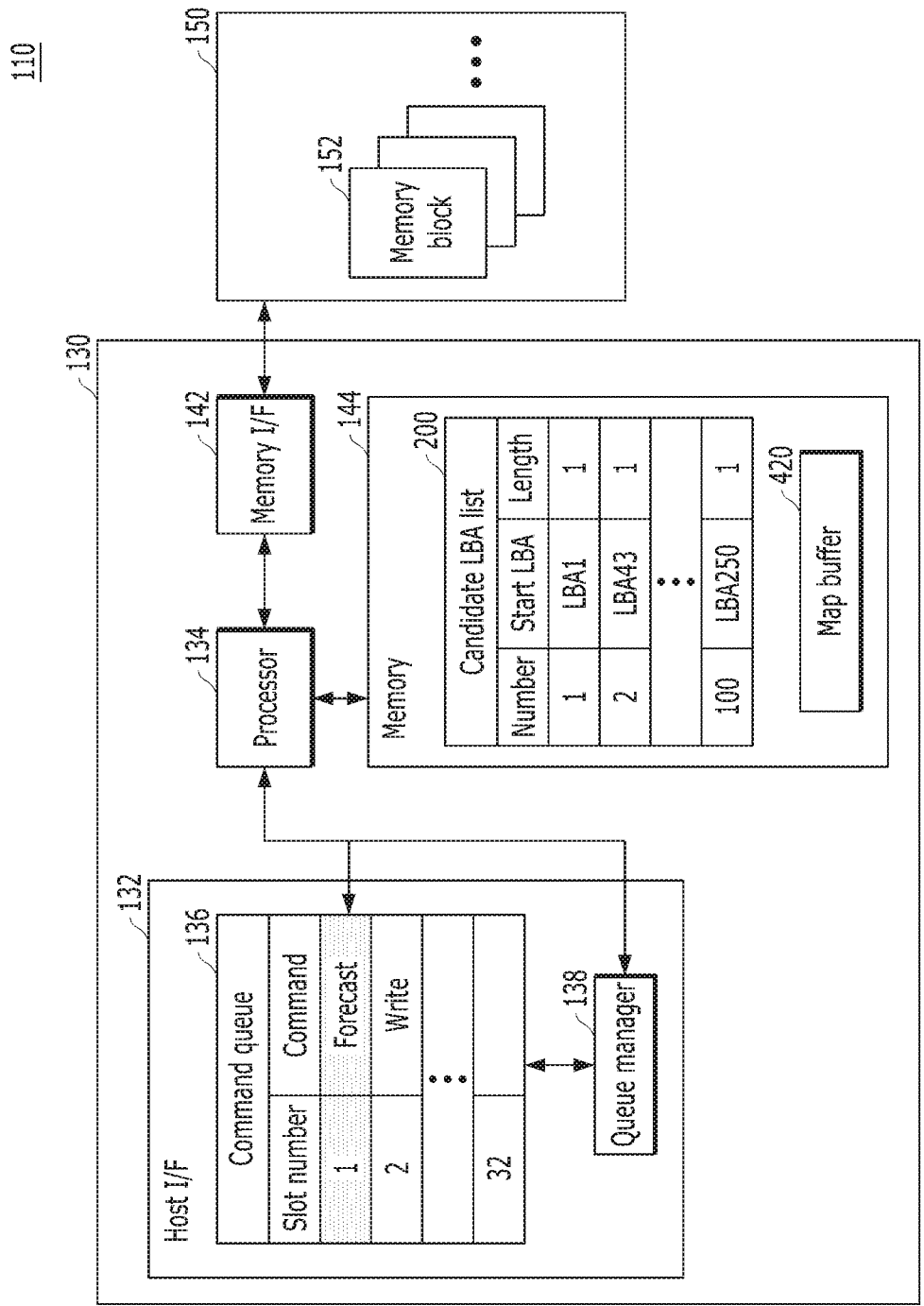

FIG. 7A is a conceptual diagram illustrating an operation of processing a forecast command in accordance with an embodiment.

Referring to FIG. 7A, the processor 134 may receive a processing request for a forecast command from the queue manager 138. The processor 134 may check the candidate LBA list 200 stored in the memory 144. The processor 134 may load a map segment corresponding to a candidate LBA from the memory device 150 to the map buffer 420, based on the candidate LBA list 200. However, when the map segment corresponding to the candidate LBA is already present in the map buffer 420, the processor 134 may retrieve a map segment corresponding to the next candidate LBA. For example, the processor 134 may first retrieve a map segment from the map buffer 420 within the memory 144. The map segment may correspond to a first LBA LBA1 which is a first candidate LBA stored in the candidate LBA list 200. If the map segment corresponding to the first LBA LBA1 is not present in the map buffer 420, the processor 134 may read the map segment from the memory device 150, and store the read map segment in the map buffer 420. On the other hand, when the map segment corresponding to the first LBA LBA1 is present in the map buffer 420, the processor 134 may directly retrieve a map segment corresponding to the second candidate LBA.

When the map segment corresponding to the first candidate LBA is completely loaded, the processor 134 may first retrieve a map segment from the map buffer 420 within the memory 144. The map segment may correspond to a 43rd LBA LBA43 which is a second candidate LBA. If the map segment corresponding to the 43rd LBA LBA43 is not present in the map buffer 420, the processor 134 may read the map segment from the memory device 150, and store the read map segment in the map buffer 420. On the other hand, when the map segment corresponding to the 43rd LBA LBA43 is present in the map buffer 420, the processor 134 may directly retrieve a map segment corresponding to a third candidate LBA.

According to the same principle, the processor 134 may store a map segment in the map buffer 420. The map segment may correspond to a 250th LBA LBA250 which is a 100th candidate LBA.

Furthermore, the processor 134 may check the end point of the forecast operation based on information on the last 'number' stored in the candidate LBA list 200 included in the forecast command. For example, since the last number stored in the candidate LBA list 200 is '100', the processor 134 may complete the forecast operation by storing the map segment, corresponding to the 250th LBA LBA250 which is the 100th candidate LBA, in the map buffer 420.

After the forecast operation is completed, the processor 134 may inform the queue manager 138 of the completing of the forecast operation. In response, the queue manager 138 may erase the forecast command queued in the command queue 136.

The processor 134 receiving the processing request for the forecast command from the queue manager 138 may check the candidate LBA list 200 stored in the memory 144.

FIG. 7B is a flowchart illustrating the operation of processing the forecast command in accordance with the present embodiment.

Referring to FIG. 7B, in step S701, the processor 134 may start processing the forecast command according to a request of the queue manager 138.

In step S703, the processor 134 may set an initial value (i.e., i=1) in order to load a map segment corresponding to a candidate LBA stored in the candidate LBA list 200.

In step S705, the processor 134 may check an $i^{th}$ candidate LBA stored in the candidate LBA list 200.

In step S707, the processor 134 may determine whether a target map segment corresponding to the $i^{th}$ candidate LBA is retrieved from the map buffer 420 within the memory 144.

If it is determined that the target map segment corresponding to the $i^{th}$ candidate LBA is not retrieved from the map buffer 420 ('No' in step S707), the processor 134 may control the memory device to detect the target map segment, and obtain the read target map segment from the memory device 150, in step S709.

In step S711, the processor 134 may receive and store the target map segment provided from the memory device 150 in the map buffer 420 within the memory 144.

In step S713, the processor 134 may check whether the current value of 'i' is the last number, based on information on the last number stored in the candidate LBA list 200 included in the forecast command.

On the other hand, when it is determined that the target map segment corresponding to the $i^{th}$ candidate LBA is retrieved from the map buffer 420 ('Yes' in step S707), the operations corresponding to steps S709 and S711 may not be performed, but the processor 134 may directly check whether the current value of 'i' is the last number, based on the information on the last number stored in the candidate LBA list 200 included in the forecast command, in step S713.

If it is determined that 'i' is not the last number ('No' in step S713), the processor 134 may increase the value 'i' of by '1' (i.e., i=1++) to perform the operations corresponding to steps S705 to S713, respectively, or to control the memory device 150, in step S715.

On the other hand, when it is determined that the value of 'i' is the last number ('Yes' in step S713), the processing operation for the forecast command may be completed. Although not illustrated in the drawing, the processor 134 may inform the queue manager 138 of the completing of the forecast operation, after the forecast operation is completed, and the queue manager 138 may erase the forecast command queued in the command queue 136. The processor 134 receiving the processing request for the forecast command from the queue manager 138 may check the candidate LBA list 200 stored in the memory 144.

Figure 8A:
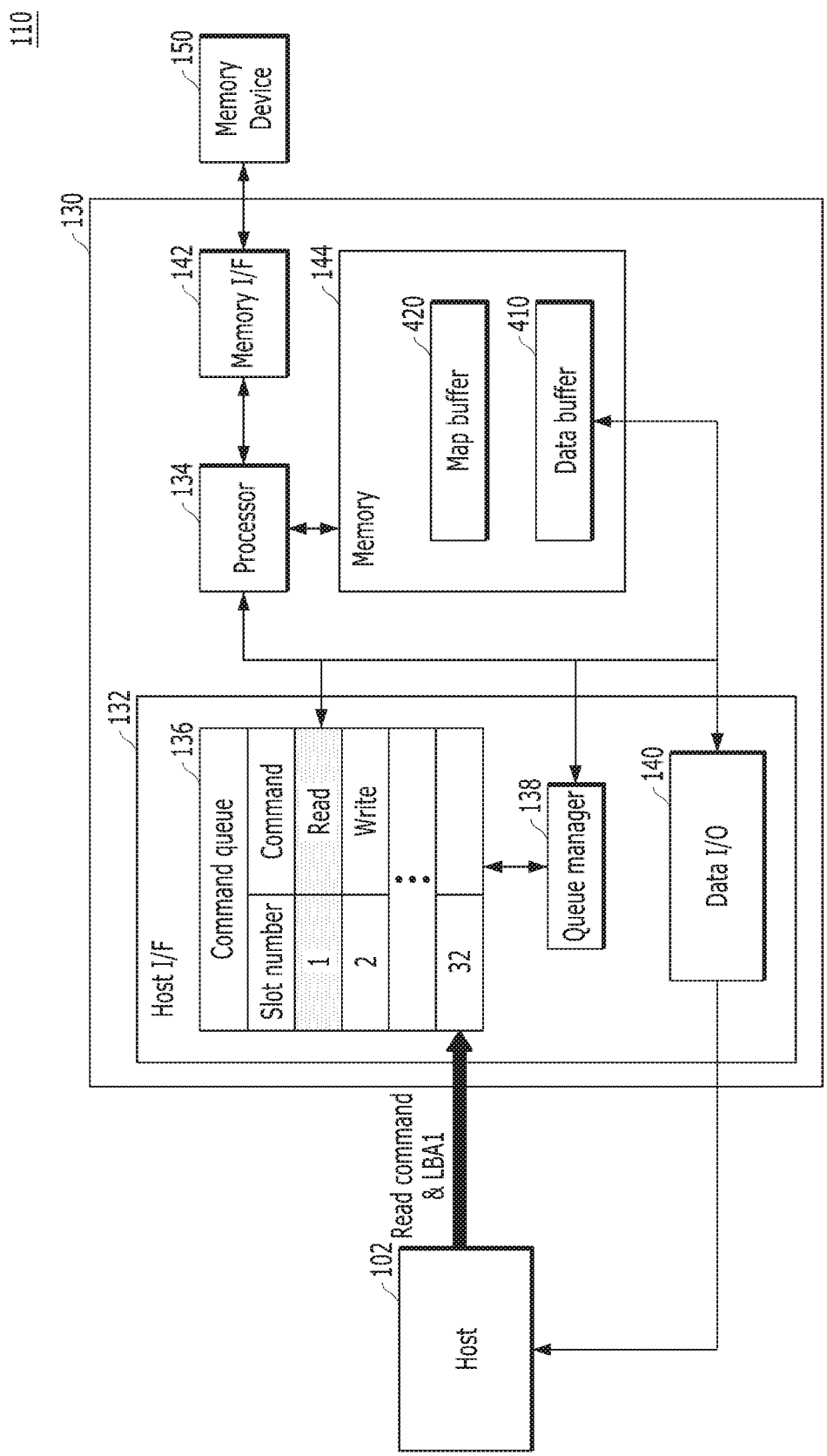

FIG. 8A is a conceptual diagram illustrating the process of processing a read command in accordance with an embodiment. In particular, FIG. 8A illustrates processing a read command corresponding to the first LBA LBA1 which is the first candidate LBA recorded in the candidate LBA list 200.

Referring to FIG. 8A, the host 102 may set the read command including information on the first LBA LBA1, and provide the read command to the memory system 110.

The command queue 136 may queue the read command provided from the host 102 in an empty slot. For convenience of description, suppose that the read command is queued in the first slot. The queue manager 138 may request the processor 134 to process the read command queued in the first slot. Then, the processor 134 may start a read operation corresponding to the read command.

First, the processor 134 may retrieve a map segment corresponding to the first LBA LBA1. However, as described with reference to FIGS. 5A to 7B, the map segment corresponding to the first LBA LBA1 may be stored in the map buffer 420. Therefore, the processor 134 may read user data corresponding to the read command from the memory device 150 based on the map segment stored in the map buffer 420.

The processor 134 may store the user data in the data buffer 410 of the memory 144. The user data may correspond to the first LBA LBA1 in the read command provided from the host 102.

The processor 134 may provide the user data to the data I/O circuit 140. In response, the data I/O circuit 140 may finally output the user data to the host 102 under control of the processor 134.

Figure 8B:
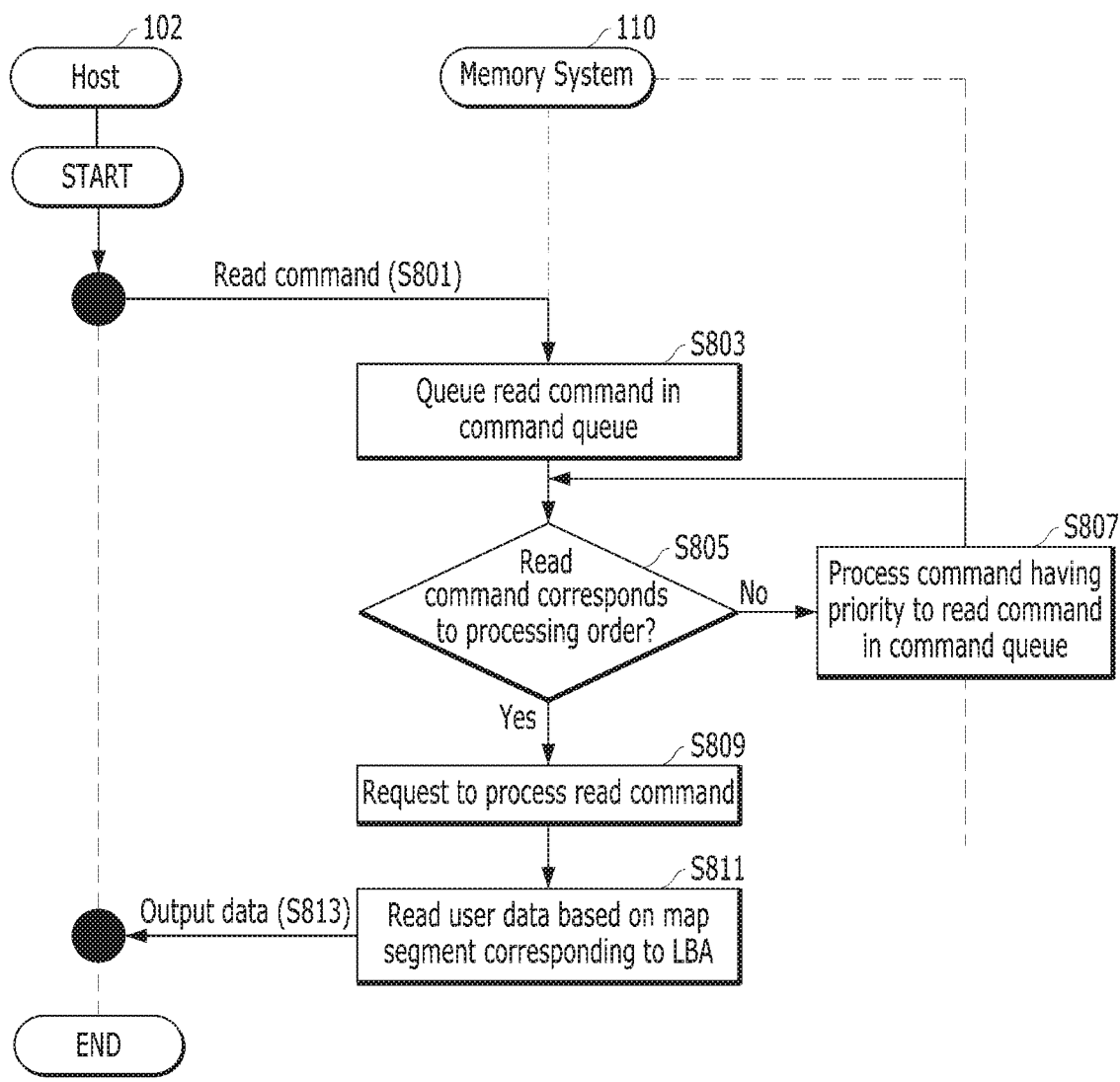

FIG. 8B is a flowchart illustrating the process of processing the read command in accordance with the present embodiment. In particular, FIG. 8B shows the process of processing the read command corresponding to the first LBA LBA1 which is the first candidate LBA recorded in the candidate LBA list 200, as described with reference to FIG. 8A.

Referring to FIG. 8B, in step S801, the host 102 may provide a read command to the memory system 110.

In step S803, the command queue 136 may queue the provided read command in an empty slot.

In step S805, the queue manager 138 may determine whether the read command corresponds to the processing order.

When it is determined that the read command does not correspond to the processing order ('No' in step S805), the queue manager 138 may request the processor 134 to process a command having a priority to the read command. Then, in step S805, the queue manager 138 may determine whether the read command corresponds to the processing order.

On the other hand, when it is determined that the read command corresponds to the processing order ('Yes' in step S805), the queue manager 138 may request the processor 134 to process the read command in step S809.

In step S811, the processor 134 may retrieve a map segment including an LBA corresponding to the read command from the map buffer 420, read user data from the memory device 150 based on the retrieved map segment, and store the read user data in the data buffer 410. Under control of the processor 134, the user data stored in the data buffer 410 may be moved to the data I/O circuit 140.

In step S813, the data I/O circuit 140 may output the user data to the host 102 under control of the processor 134.

As described above, when the host 102 cannot provide a command to the memory system 110, the host 102 may generate a list of candidate LBAs for data to be read afterwards, and provide only the list to the memory system 110. Thus, the memory system 110 may predict that a read command will be provided in the future, based on the list, even though the read command is not directly provided. Then, the memory system 110 may load a map segment to the controller 130 from the memory device 150. As a result, the time required for retrieving the map segment may be reduced, and data requested by a user may be quickly outputted by as much as the time required for retrieving the map segment is reduced.

Figure 9:
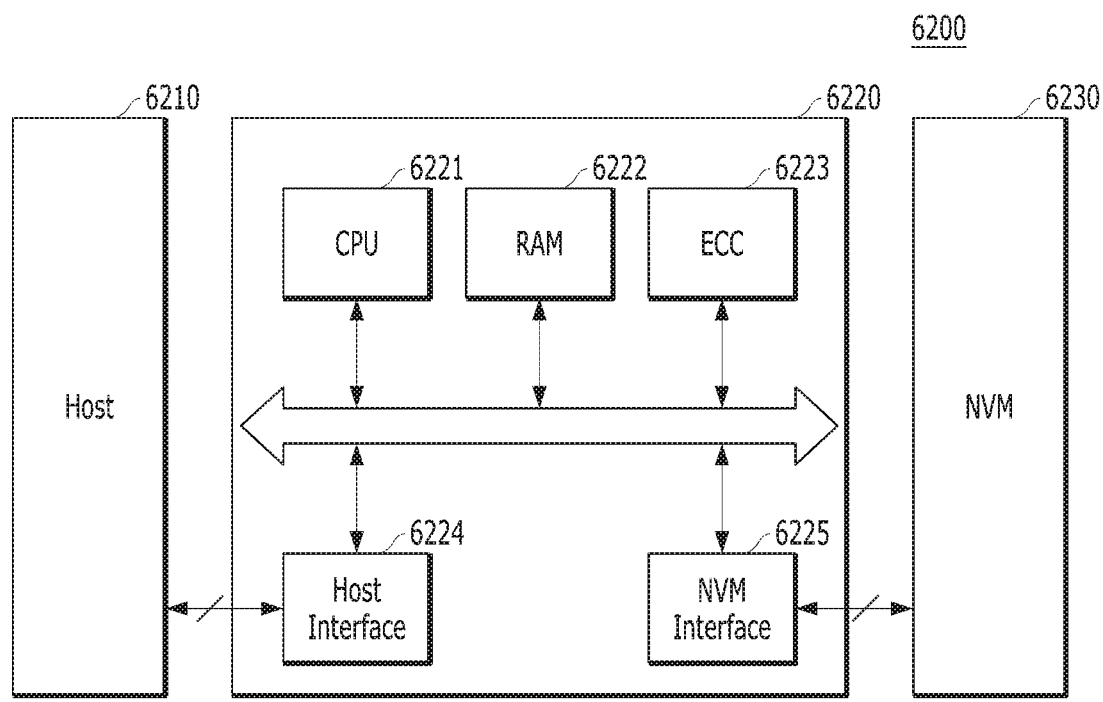
FIGS. 9 to 11 are diagrams schematically illustrating application examples of the data processing system, in accordance with various embodiments of the present invention.

FIG. 9 is a diagram schematically illustrating another example of a data processing system 6200 including the memory system in accordance with an embodiment.

Referring to FIG. 9, the data processing system 6200 may include a memory device 6230 having one or more nonvolatile memories (NVMs) and a memory controller 6220 for controlling the memory device 6230. The data processing system 6200 may serve as a storage medium such as a memory card (e.g., CF card, SD card or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210. The memory controller 6220 may include one or more central processing units (CPUs) 6221, a buffer memory such as a random access memory (RAM) 6222, an error correction code (ECC) circuit 6223, a host interface 6224 and a memory interface such as an NVM interface 6225.

Figure 10:
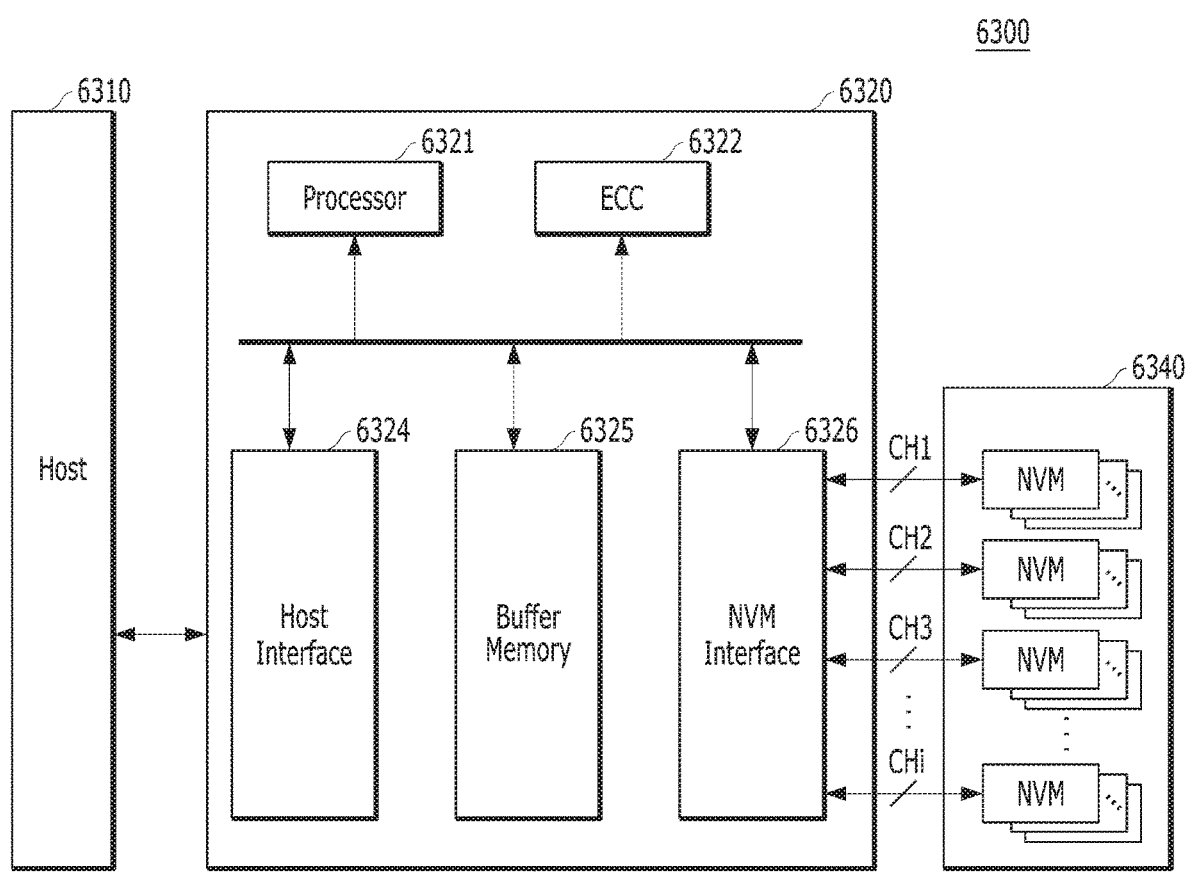

FIG. 10 is a diagram schematically illustrating another example of the data processing system including the memory system in accordance with an embodiment. For example, FIG. 10 schematically illustrates a solid state drive (SSD) 6300 to which the memory system may be applied.

Referring to FIG. 10, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, a redundant array of independent disks (RAID) system. The RAID system may include the plurality of SSDs 6300 and a RAID controller for controlling the plurality of SSDs 6300.

Figure 11:
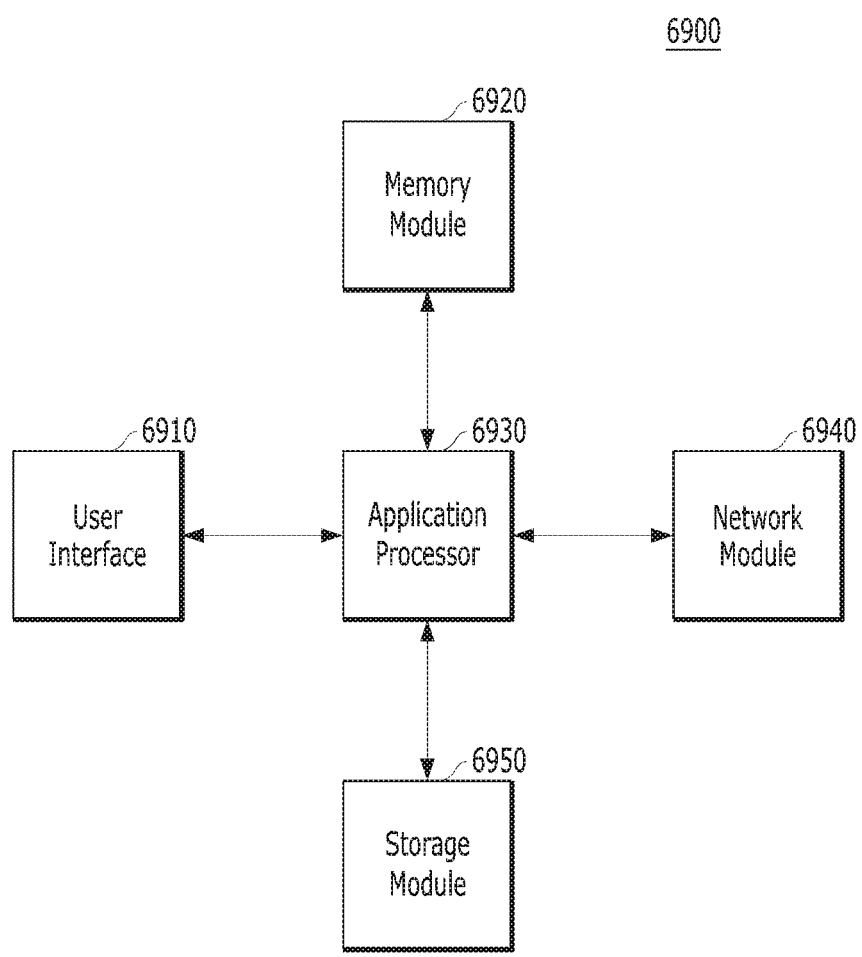

FIG. 11 is a diagram schematically illustrating another example of the data processing system including the memory system in accordance with an embodiment, for example, a user system 6900.

Referring to FIG. 11, the user system 6900 may include a user interface 6910, a memory module 6920, an application processor 6930, a network module 6940, and a storage module 6950.

The application processor 6930 may be provided as System-on-Chip (SoC).

The memory module 6920 may be used as a main memory, work memory, buffer memory or cache memory of the user system 6900. For example, the application processor 6930 and the memory module 6920 may be packaged and mounted, based on Package on Package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD as described above with reference to FIG. 10.

Although various embodiments have been described for illustrative purposes, it will be apparent to those skilled in the art that various changes and modifications may be made without departing from the spirit and scope of the invention as defined in the following claims.

What is claimed is:

1. A data processing system comprising:
a host configured to selectively generate a plurality of read commands for a plurality of logical block addresses (LBAs) or generate a candidate LBA list including the plurality of LBAs and a forecast command to pre-load target map segments corresponding to the plurality of LBAs, depending on whether a command queue of a controller has an empty slot;
a memory device configured to store a plurality of map segments and user data corresponding to the respective map segments; and
the controller configured to receive the forecast command and the candidate LBA list from the host when the empty slot occurs in the command queue, and load the target map segments from the memory device.

2. The data processing system of claim 1, wherein the candidate LBA list comprises a number indicating the order in which each LBA is stored in the candidate LBA list, a start LBA of each LBA, and a length indicating the size of each LBA.

3. The data processing system of claim 1, wherein the host comprises a list generator configured to generate the candidate LBA list, and
wherein the controller comprises:
a command queue configured to queue commands provided from the host;
a queue manager configured to decide a processing order of the queued commands, and provide the host with information on empty slots within the command queue;
a processor configured to load the target map segments from the memory device; and
a memory configured to store the loaded target map segments.

4. The data processing system of claim 3, wherein the list generator generates the candidate LBA list when the command queue has no empty slot.

5. The data processing system of claim 4, wherein
the command queue queues the provided forecast command in the empty slot, and
the queue manager requests the processor to process the forecast command in the processing order of the forecast command.

6. The data processing system of claim 5, wherein the memory stores the candidate LBA list provided from the host.

7. The data processing system of claim 5, wherein the forecast command comprises information on the last number stored in the candidate LBA list.

8. The data processing system of claim 7, wherein the processor checks whether the processing of the forecast command is completed, based on the information on the last number stored in the candidate LBA list, and informs the queue manager that the processing of the forecast command is completed, and
the queue manager erases the forecast command queued in the command queue.

9. The data processing system of claim 8, wherein the host provides a target read command corresponding to one or more target LBAs among the plurality of LBAs in the candidate LBA list, and
the controller reads target user data from the memory device based on a map segment corresponding to the target LBA stored in the memory, and outputs the read target user data to the host.

10. The data processing system of claim 3, wherein the processor loads the target map segments from the memory device when the target map segments are not stored in the memory.

11. An operation method of a data processing system, comprising:
checking, by a host, whether an empty slot is present among a plurality of slots in a command queue;
generating, by the host, a plurality of read commands for a plurality of logical block addresses (LBAs) when the empty slot is present;
generating, by the host, a candidate LBA list including the plurality of LBAs and a forecast command to pre-load target map segments corresponding to the plurality of LBAs when the empty slot is not present;
providing, by the host, the forecast command and the candidate LBA list to a controller when the empty slot occurs in the command queue;
retrieving, by the controller, the target map segments from a map buffer, based on the candidate LBA list;
loading, by the controller, the target map segments, when the target map segments are not retrieved from the map buffer; and
storing, by the controller, the loaded target map segments in the map buffer.

12. The operation method of claim 11, wherein the candidate LBA list comprises a number indicating the order in which a LBA is stored in the candidate LBA list, a start LBA of each LBA, and a length indicating the size of each LBA.

13. The operation method of claim 12, wherein the generating of the candidate LBA list comprises storing the candidate LBAs in the candidate LBA list only up to a preset number.

14. The operation method of claim 12, wherein the forecast command comprises information on the last number stored in the candidate LBA list.

15. The operation method of claim 14, further comprising:
checking whether the processing of the forecast command is completed, based on the information on the last number stored in the candidate LBA list; and
erasing the forecast command queued in the command queue.

16. The operation method of claim 12, wherein the retrieving of the target map segments comprises sequentially retrieving each target map segment corresponding to each of the candidate LBAs according to the number, and retrieving a next target map segment corresponding to a candidate LBA having a next number from the map buffer when the target map segment is retrieved from the map buffer.

17. The operation method of claim 11, further comprising:

queuing the forecast command in the empty slot within the command queue; and storing the candidate LBA list in a memory.

18. The operation method of claim 17, further comprising preferentially processing a command having a priority to the forecast command, among the commands queued in the command queue, when the command having the priority is present.

19. The operation method of claim 11, further comprising:

providing a target read command corresponding to one or more target LBAs among the plurality of LBAs in the candidate LBA list;

reading target user data from the memory device, based on a map segment corresponding to the target LBA stored in the map buffer; and outputting the target user data.

20. A data processing system comprising:

a memory device configured to store a plurality of map segments and multiple pieces of data corresponding to the plurality of map segments;

a host configured to transmit a read request for a piece of data among the multiple pieces of data, and when a command queue of a controller has no empty slot, generate and transmit a candidate list for storing address information corresponding to at least one next piece of data to be read after reading the piece of data instead of generating at least of one read command for the at least one next piece of data to be read; and a controller configured to read the piece of data from the memory device to provide the piece of data to the host, in response to the read request, receive the candidate list, and load a target map segment among the plurality of map segments from the memory device, based on the address information.

\* \* \* \* \*